United States Patent [19]

Liu

[11] Patent Number: 5,282,067
[45] Date of Patent: Jan. 25, 1994

[54] SELF-AMPLIFIED OPTICAL PATTERN RECOGNITION SYSTEM

[75] Inventor: Hua-Kuang Liu, Pasadena, Calif.

[73] Assignee: California Institute of Technology, Pasadena, Calif.

[21] Appl. No.: 772,483

[22] Filed: Oct. 7, 1991

[51] Int. Cl.$^5$ .................. G03H 1/02; G03H 1/16; G02B 27/46; G02B 27/44
[52] U.S. Cl. .......................... 359/4; 359/7; 359/29; 359/561; 359/563
[58] Field of Search .................. 359/4, 7, 21, 29, 281, 359/559, 561, 563; 382/31

[56] References Cited

U.S. PATENT DOCUMENTS

| | | | |
|---|---|---|---|
| 3,779,631 | 12/1973 | Shupe | 359/561 |
| 3,915,549 | 10/1975 | Amodei et al. | 359/7 |
| 4,674,824 | 6/1987 | Goodman et al. | 359/7 |
| 4,773,719 | 9/1988 | Anderson et al. | 359/7 |
| 4,948,212 | 8/1990 | Cheng et al. | 359/7 |
| 4,968,107 | 11/1990 | Yeh | 359/7 |
| 5,005,927 | 4/1991 | Cudney et al. | 359/7 |
| 5,150,228 | 9/1992 | Liu et al. | 359/7 |

OTHER PUBLICATIONS

Fainman et al., "Optimal Coherent Image Amplification by Two-Wave Coupling in Photorefractive BaTiO$_3$", *Optical Engineering*, Feb. 1986, pp. 228-234.
Y. Fainman, E. Klancnik, Sing H. Lee, "Optimal Coherent Image Amplification by Two-Wave Coupling in Photorefractive BaTiO$_3$", *Optical Engineering*, Feb. 1986, pp. 228-234.
N. V. Kukhtarev, V. B. Markhov, S. G. Odulov, M. S. Soskin, V. L. Vinetskii, "Holographic Storage in Electrooptic Crystals. II. Beam Coupling-Light Amplification", *Ferroelectrics*, Jan. 10, 1979, vol. 22, pp. 961-964.
Herwig Kogelnik, "Coupled Wave Theory for Thick Hologram Gratings", *The Bell System Technical Journal*, Nov. 1969, pp. 2909-2947.
David W. Vahey, "A Nonlinear Coupled-Wave Theory of Holographic Storage in Ferroelectric Materials", *Journal of Applied Physics*, vol. 46, No. 8, Aug. 1975, pp. 3510-3515.
N. V. Kukhtarev, V. B. Markhov, S. G. Odulov, M. S. Soskin, V. L. Vinetskii, "Holographic Storage in Electrooptic Crystals. I. Steady State", *Ferroelectrics*, Jan. 10, 1979, vol. 22, pp. 949-960.
H. Rajbenbach, J. P. Huignard, B. Loiseaux, "Spatial Frequency Dependence of the Energy Transfer in Two-Wave Mixing Experiments with BSO Crystals", *Optics Communications*, vol. 48, No. 4, Dec. 15, 1983, pp. 247-252.

(List continued on next page.)

Primary Examiner—Bruce Y. Arnold
Assistant Examiner—John Juba, Jr.
Attorney, Agent, or Firm—Norman E. Brunell

[57] ABSTRACT

A self amplifying optical pattern recognizer includes a geometric system configuration similar to that of a Van der Lugt holographic matched filter configuration with a photorefractive crystal specifically oriented with respect to the input beams. An extraordinarily polarized, spherically converging object image beam is formed by laser illumination of an input object image and applied through a photorefractive crystal, such as a barium titanite (BaTiO$_3$) crystal. A volume or thin-film diffraction grating is formed in the crystal during a recording mode by interference of the input object beam with a properly polarized coherent plane wave reference beam from the laser. A substantially weaker spherically converging reference image beam is then applied to the crystal with or without the plane wave reference beam and the resultant diffraction signal is detected as the pattern recognition signal at the same direction as that of the original plane wave reference beam. The amplitude of the pattern recognition signal increases until saturation in accordance with beam energy transfer in a similar mechanism as that effective in photorefractive two wave mixing beam coupling. Strong self amplification of the pattern recognition signal is obtained.

11 Claims, 1 Drawing Sheet

OTHER PUBLICATIONS

A. Marrakchi, J. P. Huignard, "Diffraction Efficiency and Energy Transfer in Two-Wave Mixing Experiments with $Bi_{12}SiO_{20}$ Crystals", *Applied Physics*, vol. 24, Spring 1981, pp. 131–138.

J. P. Huignard, A. Marrakchi, "Coherent Signal Beam Amplification in Two-Wave Mixing Experiments with Photorefractive $Bi_{12}SiO_{20}$ Crystals", *Optics Communications*, vol. 38, No. 4, Aug. 15, 1981, pp. 249–254.

D. Rak, I. Ledoux, J. P. Huignard, "Two-Wave Mixing and Energy Transfer in $BaTiO_3$ Application to Laser Beamsteering", *Optics Communications*, vol. 49, No. 4, Mar. 15, 1984, pp. 302–306.

F. Laeri, T. Tschudi, J. Albers, "Coherent CW Image Amplifier and Oscillator Using Two-Wave Interaction in a $BaTiO_3$ Crystal", *Optics Communications*, vol. 47, No. 6, Oct. 15, 1983, pp. 387–390.

F. Davidson, L. Boutsikaris, M. Krainak, "Coherent Optical Detection Through Two-Wave Mixing in Photorefractive Materials", *Optics Letters*, vol. 13, No. 6, Jun. 1988, pp. 506–508.

Ian McMichael, Pochi Yeh, Paul Beckwith, "Nondegenerate Two-Wave Mixing in Ruby", *Optics Letters*, vol. 13, No. 6, Jun. 1988, pp. 500–502.

Bernard Mainguet, "Characterization of the Photorefractive Effect in InP:Fe By Using Two-Wave Mixing under Electric Fields", *Optics Letters*, vol. 13, No. 8, Aug. 1988, pp. 657–659.

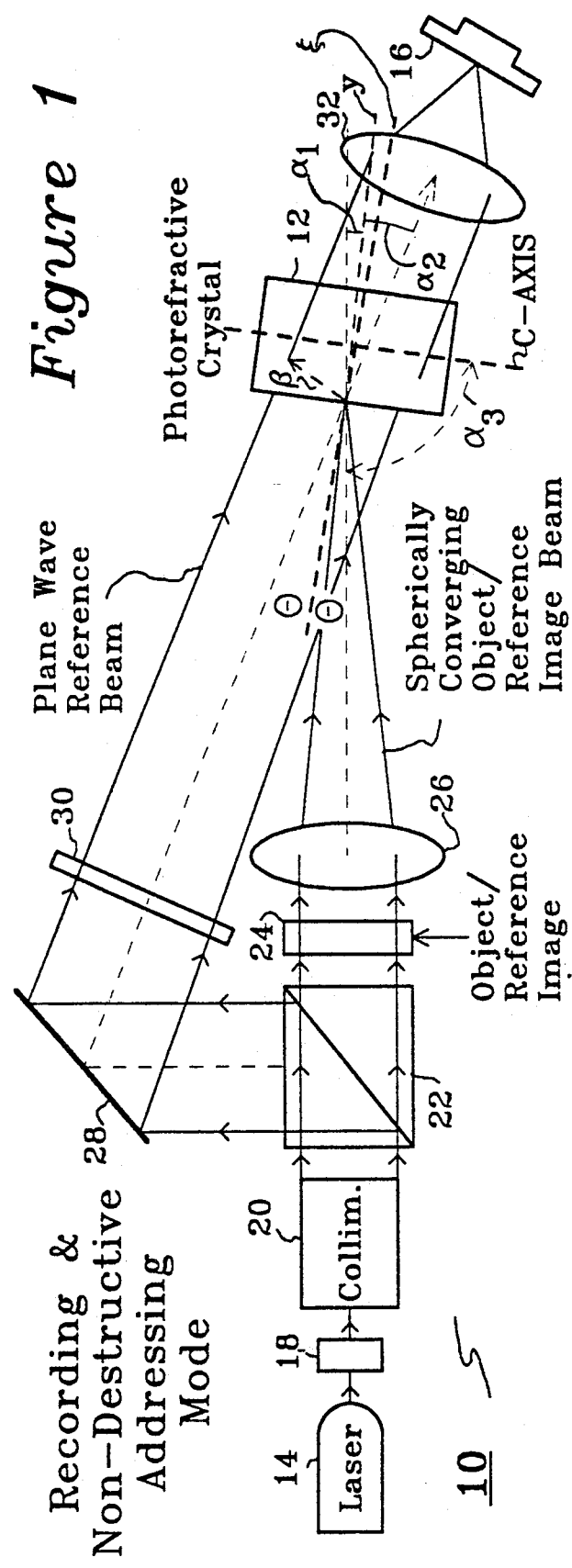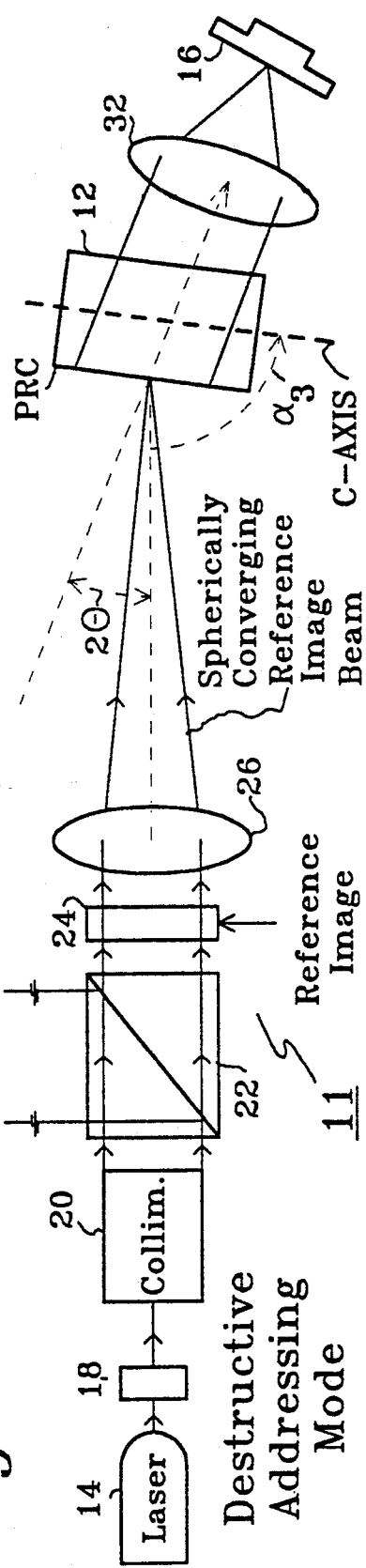

SELF-AMPLIFIED OPTICAL PATTERN RECOGNITION SYSTEM

ORIGIN OF THE INVENTION

The invention described herein was made in the performance of work under a NASA contract, and is subject to the provisions of Public Law 96-517 (35 USC 202) in which the Contractor has elected to retain title.

BACKGROUND OF THE INVENTION

1. Field of the Invention

The present invention relates optical pattern recognition systems and, in particular, to optical pattern recognition systems using photorefractive materials.

2. Description of the Prior Art

Optical pattern recognition is important for applications in many fields including machine vision, target tracking, missile homing and guidance, automation in space applications and unmanned space exploration. One of the most significant techniques used in optical pattern recognition is the acquisition of two dimensional —or 2D—correlation signals between two images, such as a stored object image and an input reference image, with an optical correlator. The intensity of the correlation signal is often used to indicate the similarity or correlation between the object and reference images.

Conventional optical pattern recognition systems use optical correlators which are only able to produce correlation signals whose intensity is limited by the diffraction efficiency of the recording medium. In particular, the correlation signal is often low due to poor diffraction efficiency of the recording medium.

Although the resultant correlation signal may then be amplified by conventional means, such post correlation amplification amplifies the correlation noise as well as the correlation signal.

One conventional optical correlator is the Vander Lugt holographic matched filter correlator described by A. B. Vander Lugt in the article "Signal Detection by Complex Spatial Filtering", IEEE Trans. Inf. Theory, IT-10, pp 139-145 (1964). The Vander Lugt optical correlator process uses a preliminary step in which an interference pattern based on the object image is recorded in a holographic plate by interference of an object beam and a plane wave reference beam. An addressing or correlation step is then used in which a reference image is applied to the previously recorded holographic interference pattern to generate a correlation signal.

In the recording process, the object image is Fourier transformed with a first Fourier transform—or FTL—lens and interfaced with a plane wave reference beam at a specific angle of incidence. The holographic plate is then developed to form the hologram. In the addressing process, the plane wave reference beam is removed and a reference image is applied to and diffracted by the interference pattern of the hologram. The diffracted beam is applied to a second FTL lens at the same angle of incidence and detected. The detected signal is proportional to the cross-correlation between the object image recorded in the hologram and the reference image later applied to the hologram. If the reference image is the same as the recorded input object, an autocorrelation signal is obtained. The diffraction efficiency of the holographic matched filter correlator is dependent on the holographic recording material used.

What is needed is an optical pattern recognition technique in which the intensity of the recognition signal is greater than that obtainable with conventional techniques.

SUMMARY OF THE INVENTION

The preceding and other shortcomings of the prior art are addressed and overcome by the present invention that provides, in a first aspect, a self-amplified optical pattern recognition technique using a photorefractive crystal as a real-time holographic filter with recording accomplished by extraordinarily polarized laser beams operated in a manner similar to that known as two wave mixing.

In another aspect, the invention provides a method of optical pattern recognition by recording a diffraction grating in a photorefractive crystal by the interference of an extraordinarily polarized spherically converging object beam and an extraordinarily polarized plane wave reference beam and forming a pattern recognition signal by application of a spherically converging extraordinarily polarized reference image beam to the diffraction grating in the photorefractive crystal with special orientations of the crystal to the input beams.

In another aspect, the invention provides an optical pattern recognition system having a photorefractive crystal, means for providing a spherically converging extraordinary polarized object image beam, an extraordinarily polarized plane wave reference beam, means for recording a diffraction grating in the photorefractive crystal, oriented in particular directions with respect to the input beams, by the interference of the spherically converging object image beam and the plane wave reference beam, means for forming a spherically converging reference image beam, and means for forming a pattern recognition signal by application of the extraordinarily polarized spherically converging reference image beam to the diffraction grating in the photorefractive crystal.

The foregoing and additional features and advantages of this invention will become further apparent from the detailed description and accompanying drawing figure or figures that follow. In the figures and written description, numerals indicate the various features of the invention, like numerals referring to like features throughout both the drawing figures and the written description.

BRIEF DESCRIPTION OF THE DRAWING

FIG. 1 is a functional block diagram of an optical pattern recognition system according to the present invention illustrating the recording and non-destructive addressing modes of operation.

FIG. 2 is a functional block diagram of a modified pattern recognition system including portions of the optical pattern recognition system shown in FIG. 1 illustrating an addressing mode of operation which may be performed without the use of the plane wave reference beam.

DETAILED DESCRIPTION OF THE PREFERRED EMBODIMENT

Referring now to FIG. 1, a functional block diagram of optical pattern recognition system 10 is shown. The optical pattern recognition performed by system 10 is accomplished in two steps. The first step is the recording mode in which a holographic grating is formed in photorefractive crystal—or PRC—12 by the interference of a converging spherical beam, containing the object image illuminated by laser 14, with a plane wave reference beam from the same laser 14.

This recording mode of operation is somewhat similar in concept to the known two-wave mixing beam coupling technique which may be used with a PRC crystal to transfer energy from a strong plane wave beam to a weak plane wave signal beam during continuous or real time operation. In this technique, a strong and a weak plane wave are applied to the PRC crystal to record a dynamic grating as a result of charge generation and diffusion transfer creating permittivity variations. There is a detectable energy transfer from the strong beam to the weak beam when the permittivity grating is shifted relative to the interference pattern of the strong and weak plane waves. This energy transfer becomes a maximum when the phase shift of the grating is $\pi/2$.

In accordance with the present invention, however, a Vander Lugt style correlator is configured to use a signal enhancement technique related to the above described two wave mixing. In the present invention, a holographic grating is stored in PRC crystal 12 which operates as an optical memory. The enhancement of the weaker beam occurs when both beams are applied during both the recording and addressing modes of operation.

A volume holographic diffraction grating may be formed in PRC crystal 12 or a thin-film diffraction grating may be formed by using a thin piece of photorefractive crystal as PRC crystal 12. A volume diffraction grating provides high gain for the beam coupling energy transfer described herein, while a thin-film diffraction grating provides shift invariance in pattern recognition.

The techniques used to maximize beam coupling energy transfer in the conventional two-wave mixing technique described above are used during the recording mode of operation of optical pattern recognition system 10 as illustrated, for example, in FIG. 1. In particular, $2\theta$—the total angle between the two input beams, $\alpha_3$—the incident angle of the axis of the spherically converging object beam with respect to the c-axis of PRC crystal 12, the polarization, intensity ratio and wavelength of the input beams are all selected so that the maximum beam coupling energy transfer will occur in PRC crystal 12. These parameters are known, or may be determined during optimization processes, for typical ferroelectric PRC crystals, such as barium titanite (BaTiO$_3$) crystals.

In a particular experimental implementation of optical pattern recognition system 10 in accordance with the present invention, a Spectra Physics Model 2000 argon ion laser is used as laser 14 to provide 514.5 nm light to polarization rotator 18 and collimator 20. The output of collimator 20 is split by beam splitter 22 for illumination of the object image and to provide the plane wave reference beam. Polarization rotator 18 is used to make the output of laser 14 beam extraordinary before it is applied to collimator 20.

The object image may be an optical transparency or similar image forming device such as a spatial light modulator—or SLM—24, to which an input object image is applied. The output of SLM 24 is Fourier transformed to form a spherically converging object beam by first Fourier transform—or FTL—lens 26. The spherically converging object beam is applied to the surface of PRC crystal 12 at an angle of incidence, $\alpha_3$, of about 45° to the c-axis of PRC crystal 12. The focal point of the spherically converging object beam is at the surface of PRC crystal 12 which is assumed to be parallel to the c-axis of the crystal.

The coherent plane wave reference beam obtained from beam splitter 22 is applied by suitable optical transfer mechanisms, such as mirror 28 and neutral density filter or shutter 30, to the same surface of PRC crystal 12 as the spherically converging object image beam, but at a relative beam angle $2\theta$ with respect to the spherically converging object image beam on the order of about 4°. Shutter 30 may be used to control the intensity of the plane wave reference beam during the recording mode or may be used to block or otherwise divert the plane wave reference beam during the addressing mode. The power of the plane wave reference beam was in ' - range of about 1 mW/cm$^2$ in the experimental implementation discussed above.

FIG. 2 illustrates optical pattern recognition system 11, a modified version of optical pattern recognition system 10, in which the plane wave reference beam is not applied to PRC crystal 12 during the addressing mode of operation.

PRC crystal 12 may be a 5 mm×5 mm×8 mm barium titanite crystal supplied by Sanders Associates having a strong linear electro-optic coefficient $r_{42}=820\times10^{-12}$ m/V to achieve the high coupling gain.

There are two ways of addressing the image stored in the diffraction grating in PRC crystal 12. In the addressing mode illustrated in FIG. 1, the object image applied to SLM 24 is replaced with a reference image to form a spherically converging reference image beam applied by FTL lens 26 to PRC crystal 12. Shutter 30 permits the plane wave reference beam to also be applied to PRC crystal 12 in the same manner as described above during the recording mode of operation. The pattern recognition signal is detected by operation of output FTL lens 32 and detector 16 as described below in greater detail with reference to optical pattern recognition system 11 as shown in FIG. 2.

In the addressing mode of optical pattern recognition system 10 as shown in FIG. 1, the diffraction grating in PRC crystal 12 is supported and reinforced by the plane wave reference beam during the addressing mode. This approach therefore provides a non-destructive addressing mode if the original input is used.

An alternate addressing mode is illustrated in FIG. 2, in which the plane wave reference beam in optical pattern recognition system 11 is blocked for example by the operation of shutter 30 (shown in FIG. 1) or by any other suitable means. The reference image is then applied to SLM 24 and illuminated by laser 14 after suitable processing by polarization rotator 18 and collimator 20 to form a reference image beam. The reference image beam is then Fourier transformed by FTL lens 26 to form a spherically converging reference image beam and applied to PRC crystal 12 at the same angle of incidence, $\alpha_3$.

As shown in FIG. 2, the output or pattern recognition signal available from PRC crystal 12 is applied by output FTL lens 32 to detector 16. The angle between the axis of the spherically converging reference image beam and the axis of the pattern recognition signal beam applied by output FTL lens 32 to detector 16 is angle $2\theta$, the angle between the previously applied plane wave reference beam and the spherically converging object image beam.

When the magnitude of the spherically converging reference image beam was very low, on the order of only one one ten thousandth of the spherically converging object image beam, the pattern recognition signal read by detector 16 was much larger than otherwise conventionally available.

Substantial information concerning optimization of the two-wave coupling process is available in the technical literature, for example, in the article by Fainman et al. entitled "Optimal coherent image amplification by two-wave coupling in photorefractive BaTiO$_3$", Optical Engineering, Col. 25, No. 2, February 1988. As described in that publication, the gain resulting from energy coupling by the interaction of two coherent beams in nonlinear refractive media, such as PRC crystal 12, is given by equation (1):

$$G_0 = \frac{(1 + r) \exp(\Gamma L_{eff})}{1 + r \exp(\Gamma L_{eff})} \quad (1)$$

where the gain $G_o$ is defined as the intensity ratio of the output signal beam in the presence of a pump beam to that in the absence of a pump beam, $\Gamma$ is the exponential gain coefficient related to the coupling strength $\gamma$ as shown in equation (2):

$$\Gamma \overset{\Delta}{=} 2Re\,(\gamma), \quad (2)$$

$L_{eff}$ is the effective interaction length, and r is the ratio of the input signal beam intensity to the pump beam intensity.

For two beams with unit polarization vectors $\hat{e}_1$ and $\hat{e}_2$ intersecting PRC crystal 12 at angles $\alpha_1$ and $\alpha_2$, as shown in FIG. 1, from the normal to the surface of PRC crystal 12, the coupling $\gamma$ is given by equation (4):

$$\gamma = \frac{\omega\, E r_{eff}}{2nc\, \cos\theta} \quad (4)$$

where angle $\theta$, half the angle between the plane wave reference beam and the spherically converging object image beam, is equal to half the sum of $\alpha_1$ and $\alpha_2$, $\omega$ is the optical frequency, c is the speed of light and n is the refractive index chosen according to the polarization of the beams.

In the present invention, the beams are extraordinarily polarized, that is, the E field of the beam is normal to the plane formed by the axes of the plane wave and object image beam shown in FIG. 1. The effective Pockels coefficient $r_{eff}$ shown in equation (4) above, for a barium titanite crystal used as PRC crystal 12 can therefore be written as shown in equation (5):

$$r_{eff} = \frac{1}{2}\,[n_o^4 r_{13}(\cos 2\theta - \cos 2\beta) + 4n_e^2 n_o^2 r_{42}\sin^2\beta + \quad (5)$$

$$n_e^4 r_{33}(\cos 2\beta + \cos 2\theta)]\cos\beta$$

where $n_o$ and $n_e$ are the respective ordinary and extraordinary indices of refraction at the wavelength $\lambda$, $r_{ij}$ are the elements of the linear electro-optic tensor (Pockels coefficients) and $\beta$ is equal to one half the difference between $\alpha_1$ and $\alpha_2$.

For barium titanite at $\lambda=514.5$ nm, $n_o=2.488$, $n_e=2.242$, the linear electro-optic coefficients are $r_{13}=8$, $r_{33}=28$ and $r_{42}=820$, in units of $10^{-12}$ m/V. The exceptionally large value for the $r_{42}$ coefficient will yield a high value for $r_{eff}$ under the conditions that extraordinary polarization is used for the input beams and that the two beam interfere to generate slanted gratings of nonzero $\beta$. Further information is available in the above referenced publication by Fainman et al.

Referring now to FIG. 2, a functional block diagram of the pertinent portions of optical pattern recognition system 10 is shown to illustrate the addressing mode of operation in greater detail. After the holographic grating is produced in PRC crystal 12 during the recording mode, the pattern recognition signal is produced during the addressing mode by applying a comparison or reference image, also illuminated by laser 14, as a spherically converging reference image beam to PRC crystal 12 at the same angle as the original spherically converging object image beam was applied.

The pattern recognition signal is detected by a conventional optical signal detection device such as a photodiode array or charge coupled device—or CCD—such as detector 16 along the axis of the application of the plane wave during the recording mode. In accordance with the present invention, a relatively weak spherically converging reference image beam is used as the addressing beam applied to PRC crystal 12. The intensity of the addressing beam may be on the order of one hundred thousandth of the original object image beam or even lower. Due to beam coupling energy transfer from the addressing beam to the diffracted pattern recognition signal, the intensity of the resultant pattern recognition signal detected by detector 16 will be greatly amplified as compared with conventional techniques.

In particular, the output of detector 16 will initially be weak and will then begin to grow until saturation is reached. The saturated peak value of the pattern recognition signal will remain relatively constant as long as the reference beam is applied. The pattern recognition signal intensity detected by detector 16 may be many orders of magnitude greater than would otherwise be attainable.

The intensity of the spherically converging addressing beam is also important with regard to the erasure of the holographic interference pattern in PRC crystal 12 when this beam is applied without the accompanying plane reference beam. The stronger the spherically converging addressing beam, the faster the hologram will be erased. In the experimental implementation discussed above, the pattern recognition signal decayed to about one third its value within one minute after the plane wave reference signal was removed. After five minutes, the pattern recognition signal was reduced to about 3% of its original value. As the intensity of the spherically converging reference beam is increased, the pattern recognition signal was shown to decay faster.

The decay of the pattern recognition signal indicates erasure of the hologram by application of only the spherically converging addressing image beam. This erasure may be used to reprogram optical pattern recognition system 10.

On the other hand, if the non-destructive addressing mode illustrated in optical pattern recognition system 10 and shown in FIG. 1 is used while both the same image and plane wave reference beams are applied simultaneously but at very low intensity levels, the detected signal will remain at about the same intensity level without substantial decay. This results from the self-amplification and beam coupling energy transfer described above which causes the replenishment of the diffraction grating in PRC crystal 12.

While this invention has been described with reference to its presently preferred embodiments, its scope is not limited thereto. Rather, such scope is only limited in so far as defined by the following set of claims and includes all equivalents thereof.

What is claimed is:

1. A method of optical self-amplified pattern recognition, comprising the steps of:
   recording a diffraction grating in a photorefractive crystal by the interference of an extraordinarily polarized, spherically converging object beam and a plane wave reference beam; and
   forming a pattern recognition signal related to the correlation between the object beam and a reference image beam by application of a spherically converging reference image beam to the diffraction grating in the photorefractive crystal.

2. The method of claim 1 wherein the step of recording the diffraction grating in the photorefractive crystal further comprises the steps of:
   focussing a polarized, coherent spherically converging object image beam on the crystal at an angle $\alpha$ with respect to the c-axis of the crystal;
   applying a polarized, coherent plane wave reference beam to the crystal at the focal point of the spherically converging object image beam at an angle $\theta$ to the spherically converging object image beam; and
   selecting the polarization, intensity and wavelength of object image and plane wave reference beams, and angles $\alpha$ and $\theta$ at which such beams are applied to the crystal, to maximize the energy transfer between the later applied spherically converging reference image beam to the pattern recognition signal.

3. The method of claim 1 wherein the step of forming a pattern recognition signal further comprises the step of:
   simultaneously re-applying the same polarized, coherent plane wave reference beam applied during the step of recording the diffraction grating so that the step of forming the pattern recognition signal is non-destructive with regard to the diffraction grating.

4. The method of claim 1 wherein the step of recording a diffraction grating further comprises the step of:
   recording a volume diffraction grating.

5. The method of claim 1 wherein the step of recording a diffraction grating further comprises the step of:
   recording a thin-film diffraction grating.

6. An optical self amplified pattern recognition system, comprising:
   a photorefractive crystal;
   means for providing a polarized, spherically converging object image beam;
   a polarized plane wave reference beam;
   means for recording a diffraction grating in the photorefractive crystal by the interference of the spherically converging object image beam and the plane wave reference beam;
   means for forming a spherically converging reference image beam; and
   means for forming a pattern recognition signal related to the correlation between the object beam and a reference image beam by application of the spherically converging reference image beam to the diffraction grating in the photorefractive crystal.

7. The optical self amplified pattern recognition system claimed in claim 6 wherein the means for forming a pattern recognition signal further comprises:
   means for simultaneously re-applying the same plane wave reference beam so that the diffraction grating is not destroyed.

8. The optical self amplified pattern recognition system claimed in claim 6 wherein the optical diffraction grating is a volume diffraction grating.

9. The optical self amplified pattern recognition system claimed in claim 6 wherein the optical diffraction grating is a thin-film diffraction grating.

10. A method of optical self-amplified pattern recognition, comprising the steps of:
    recording a thin-film diffraction grating in a photorefractive crystal by the interference of an extraordinarily polarized, spherically converging object beam and a plane wave reference beam; and
    forming a pattern recognition signal by application of a spherically converging reference image beam to the diffraction grating in the photorefractive crystal,
    wherein the step of recording the diffraction grating in the photorefractive crystal further comprises the steps of:
    focussing a polarized, coherent spherically converging object image beam on the crystal at an angle $\alpha$ with respect to the c-axis of the crystal;
    applying a polarized, coherent plane wave reference beam to the crystal at the focal point of the spherically converging object image beam at an angle $\theta$ to the spherically converging object image beam; and
    selecting the polarization, intensity and wavelength of object image and plane wave reference beams, and angles $\alpha$ and $\theta$ at which such beams are applied to the crystal, to maximize the energy transfer between the later applied spherically converging reference image beam to the pattern recognition signal.

11. An optical self-amplified pattern recognition system, comprising:
    a photorefractive crystal;
    means for providing a polarized, spherically converging object image beam;
    a polarized plane wave reference beam;
    means for recording a thin-film diffraction grating in the photorefractive crystal by the interference of the spherically converging object image beam and the plane wave reference beam;
    means for forming a spherically converging reference image beam; and
    means for forming a pattern recognition signal by application of the spherically converging reference image beam to the diffraction grating in the photorefractive crystal.

* * * * *